W. SPRAGUE.
Corn Planter.
No. 10,644.  Patented Mar. 14, 1854.
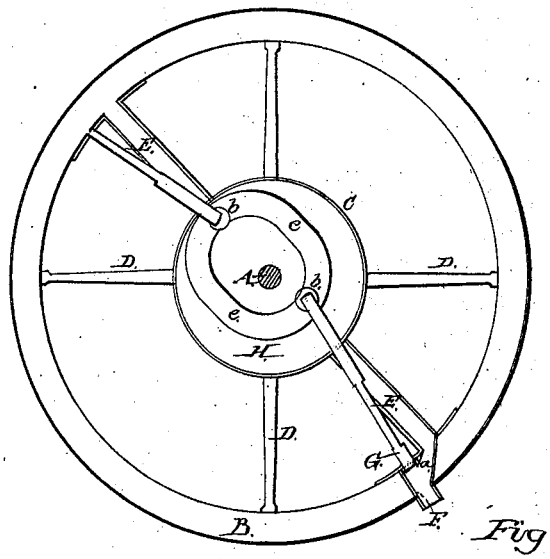
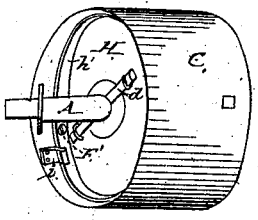
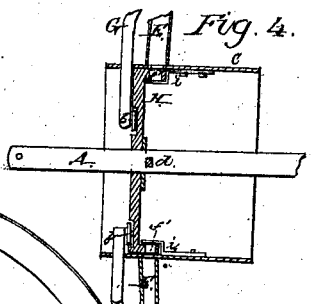
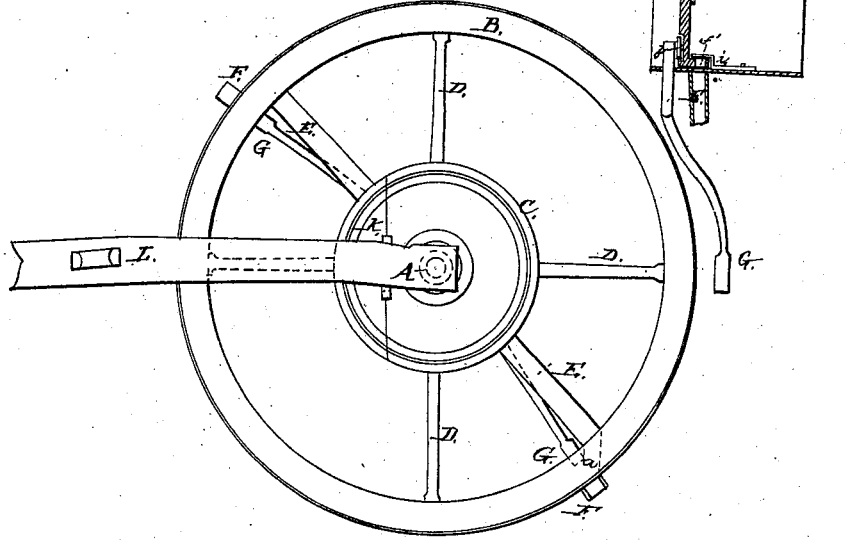

UNITED STATES PATENT OFFICE.

WELCOME SPRAGUE, OF ELLICOTTVILLE, NEW YORK.

IMPROVEMENT IN SEED-PLANTERS.

Specification forming part of Letters Patent No. 10,644, dated March 14, 1854.

*To all whom it may concern:*

Be it known that I, WELCOME SPRAGUE, of Ellicottville, in the county of Cattaraugus and State of New York, have invented certain new and useful Improvements in Seed Planters or Drills; and I do hereby declare that the following is a full, clear, and exact description of the same, reference being had to the accompanying drawings and letters thereon, making a part of this specification, of which—

Figure 1 is an elevation showing the exterior of the wheel, the flap or opening on one end of the hub for the introduction of the seed into the reservoir, and a portion of one of the handles by which it is propelled or drawn. Fig. 2 is a central vertical section of the rim or felly, conducting-tubes, and the rear side of the diaphragm with the cam-groove therein. Fig. 3 is a view of the front of the same with the rim raised thereon, cup or perforated receptacle in this rim, stop-plate, &c.; Fig. 4, a cross-section of the hub, diaphragm, piston, rods, &c.

The advantages of this planting or seeding machine will be appreciated when it is considered at how great a cost the various devices in the shape of tines, spring-teeth, hoppers, &c., heretofore required, and that few, if any, will deliver the seed with certainty, particularly if the earth is a little overmoist or not in good order.

The nature of my invention consists in so constructing this seeding-machine that the several operations of making the dibble or receptacle in the soil, conveying the seed from the hopper or reservoir, delivering the same therefrom, and with certainty insuring its conveyance and deposit in the earth shall all be effected by the most simple and economical arrangement of mechanism, and that without a single cog or gear, by the mere rolling over of the wheel on the earth, as in a common drill-barrow.

In the device now presented there is but one drill-wheel presented. It is equally adapted and will be understood as applied to any desired number placed on the same shaft or axis. The number of conducting-tubes may be also increased, as I do not confine myself either to number or position of the different parts of the drill.

In the several figures, A is the axis or shaft, which, instead of being a rolling one, is secured in the propelling handles or frame; B, the rim or felly of the wheel; C, the hub, consisting in this invention of a hollow metallic cylinder, forming the hopper or seed-reservoir.

D D D D are four solid spokes connecting the hub and rim.

E E are metallic tubes, also connected with the hub and rim by suitable flanges opening into the hub, and a slanting hollow formed in the substance of the rim. They form the means of communication for the seed to pass to the soil.

F F are short metallic tubes passing through the rims, and having a side opening communicating with the hollow $a$ in the rim. They also project beyond the periphery, and thus make the indent in the soil.

G G are pistons working in F F, furnished with rods passing through the hub, and having on their upper ends small rollers $bb$. These rods require to be slightly bent, so that they will pass through the hub near the front edge thereof, the object being that of preserving the greatest capacity in the hopper by throwing the diaphragm therein toward one end of the hub.

H is the diaphragm, fastened by a cross-arm, $d$, to the axis A, by which it is prevented from turning. $ee$ is the cam-shaped groove on the face of H, in which the rollers $bb$ of the piston-rod freely travel. (See Fig. 2.) Upon the rear side of the diaphragm is a raised rim or flange, $h$. (See Fig. 3, and in cross-section, Fig. 4.) This rim is perforated with two holes, $ff$, which, when open by being from under the stops $ii$, are filled with seed from the hub, and then, again passing under these stops, drop the seed into the hollow tube E E opening under these stops.

K in Fig. 1 is a flap-door forming a portion of the cover of one end of the hub.

L is one of a pair of handles by which the drill-barrow is propelled.

The operation is as follows: The seed having been introduced into the hollow hub C at the door K, on the rotation of the rim and hub on the fixed axis A gives opportunity for the filling the cups $f'$ in the rim $h'$ of the diaphragm H. On the rotation of the hub the stops $ii$ pass over the cup on the upper side thereof, and the opening under said stops, communicating with the hollow tubes E, passes under the cup, and thus permit the full cup to be discharged, which, falling into the short tubes F F, making indents in the earth, pass thus into the soil. The piston G serves the double purpose of a valve and tube-clearer by forcing out not only the seed, but any packed earth in said tubes.

Having described the nature of my improvements in seed-planters, what I claim as my invention, and desire to secure by Letters Patent, is—

The combination of the hollow hub C or grain-reservoir with the tubes E E and F F, piston and rods G G, operated by the cam-groove $e\ e$, or its equivalent, on the diaphragm H, the whole arranged in the manner substantially as set forth, for the purpose of insuring the deposit of the seed in the soil.

In testimony whereof I have signed my name before two subscribing witnesses.

WELCOME SPRAGUE.

Witnesses:
JOHN F. CLARK,
SAML. GRUBB.